United States Patent [19]

Hallinan

[11] Patent Number: 5,288,302
[45] Date of Patent: Feb. 22, 1994

[54] METHOD AND APPARATUS FOR EXTRACTION OF METAL VALUES FROM METAL BEARING ORES

[75] Inventor: Mark S. Hallinan, Westdene, South Africa

[73] Assignee: African Oxygen Limited, Selby, South Africa

[21] Appl. No.: 895,310

[22] Filed: Jun. 8, 1992

[30] Foreign Application Priority Data

Jun. 6, 1991 [ZA] South Africa ............. 91/4337

[51] Int. Cl.$^5$ ................ C22B 3/02; C22B 3/12
[52] U.S. Cl. ................... 75/744; 266/170; 423/29
[58] Field of Search .............. 423/29; 266/170; 75/744

[56] References Cited

U.S. PATENT DOCUMENTS 5,071,477 12/1991 Thomas et al. ............. 75/744

Primary Examiner—Melvyn J. Andrews
Attorney, Agent, or Firm—Larry R. Cassett

[57] ABSTRACT

This invention relates to the extraction of metal values from metal bearing ores. More specifically, according to the invention, in a process for extracting metal values from metal bearing ores, there is provided a method of enhancing metal value recovery from the ore. The method comprises introducing, upstream of a metal recovery section 26, a gaseous or liquid agent capable of promoting recovery of the metal values from the ore, into the gland service water from at least one of the pumps 30. The introduction of the gaseous or liquid agent is by means of an arrangement 35. The agent may be oxygen.

14 Claims, 1 Drawing Sheet

METHOD AND APPARATUS FOR EXTRACTION OF METAL VALUES FROM METAL BEARING ORES

TECHNICAL FIELD

THIS INVENTION relates to the extraction of metal values from metal bearing ores.

BACKGROUND OF THE PRIOR ART

The Applicant is aware of a process for extracting metal values from metal bearing ores which comprises, in a milling stage, milling wetted ore to produce a slurry; adding a lixiviant to the slurry from, the milling stage; passing the slurry to a leaching stage where the lixiviant leaches metal from the ores, with the metal thus being dissolved in the lixiviant; passing the leached slurry to a carbon-in-pulp ('CIP') absorption section where the slurry is contacted with activated carbon particles which absorb the metal from the lixiviant; separating the carbon particles from the residual slurry; and, in a metal recovery section, recovering the metal from the carbon particles. Instead of the separate leaching and absorption stages, a combined leaching and carbon absorption ('CIL') stage can be provided. The slurry conveyance to the various stages, as well as within each stage from one item of processing equipment to the next, is effected along pipelines, some of which are fitted with pumps. At least some of the pumps are centrifugal pumps each comprising a pump housing, and a rotatable pump shaft on which is mounted an impeller or the like, located in the housing and providing from the housing, with glands or seals being provided around the shaft where it passes through the housing. A gland service water arrangement, for flushing the glands with service water, is then also provided, with the gland service water after flushing the glands admixing with the slutty being pumped by the pump. Such a process is hereinafter also referred to as a 'process of the kind described'.

SUMMARY OF THE INVENTION

According to the invention, there is provided, in a process of the kind described for extracting metal values from metal-bearing ores, a method of enhancing metal value recovery from the ore, which comprises introducing, upstream of the metal recovery section, a gaseous or liquid agent capable of promoting recovery of the metal values from the ore, into the gland service water of at least one of the pulps.

The method nay be a noble metal, particularly gold, so that the ore is gold-bearing ore, and the lixiviant may be a cyanide-based substance such as an alkali metal cyanide, e.g. calcium or sodium cyanide. The gaseous agent may then be oxygen gas or an oxygen-containing gas.

Sufficient gas may be introduced collectively at all the zones/points to ensure that the dissolved oxygen levels in the slurry are maintained at values slightly higher than the saturation level of oxygen in slurry open to atmosphere. The gas introduction may be effected by injecting the gas into the pipelines, and the injection rate may be between 0.1 and 0.2 kg oxygen per tonne of ore.

The gland service water arrangement may comprise a make-up water conduit leading to a gland service water tank, a pump suction conduit leading fron the tank to the suction side of a gland service water pump, and a pump discharge conduit leading from the pump to the pump glands. The agent introduction may then be effected by injecting it into at least one of the conduits and/or by sparging it into the tank.

BRIEF DESCRIPTION OF THE DRAWINGS

The invention will now be described by way of example with reference to the accompanying simplified flow diagram of a process according to the invention for extracting gold from gold-bearing ores.

DETAILED DESCRIPTION OF THE INVENTION

Figure 1:
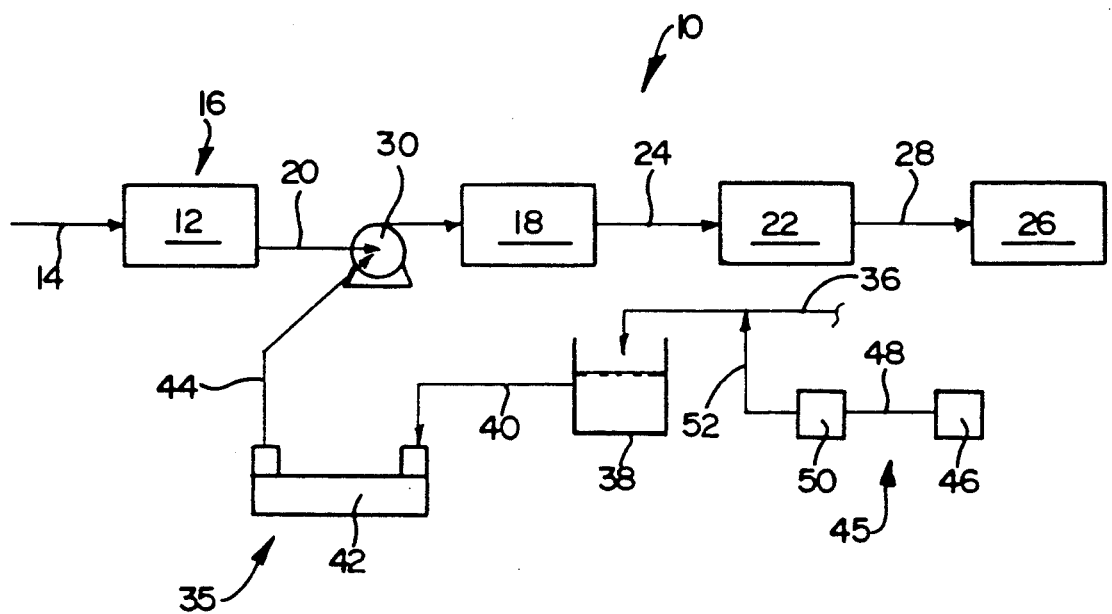

In the drawing, reference numeral 10 generally indicates a process for extracting gold from gold-bearing ore, in accordance with the invention.

The process 10 includes a milling stage 12, with flow lines 14, 16 leading into the stage 12. It also includes a leaching stage 18, with a flow line 20 leading from the stage 12 to the stage 18. A CIP stage 22 is located downstream of the leaching stage 18 and is connected thereto by means of a flow line 24. A gold recovery stage 26 is located downstream of the stage 22 and is connected thereto by means of a flow line 28. It is to be appreciated that each of the flow lines 14, 20, 24 and 28 can comprise one or more pipelines, while, within each of the stages 12, 18 and 22 one or more pipelines may interconnect various items of processing and ancillary equipment. It is to be appreciated that the stages 18, 22 can be replaced by a single CIL stage, if desired.

The process also provides a centrifugal pump 30 in the pipeline 20. The pump 30 is of a type having a housing or casing with a shaft extending through the casing and on which is mounted an impeller. The pump shaft is driven to rotate by an electrical motor or the like. Glands or seals are provided between the pump shaft and the casing, and the glands are connected to a gland service water arrangement 35, for flushing the glands with service water at high pressure to maintain the gland integrity, i.e. to prevent slurry leaking from the pump along the impeller shaft and causing mechanical wear, with this service water then entering the slurry being pumped by the pump. Significant volumes of gland water are used and this in practice leads to a reduction in slurry density across the pumping circuit.

It is to be appreciated that similar pumps (not shown) can instead or additionally, be provided in the flow line 24 and/or the flow line 28, and even within the stages 12, la and 22, and these pumps will then also be connected to the arrangement 35 or will each have their own such arrangement.

The arrangement 35 comprises a water supply conduit 36 leading to a gland service water tank 38. A pump suction conduit 40 leads from the tank 38 to the suction side of a gland service water pump 42, with a pump discharge conduit 44 leading from the pump discharge to the glands of the pump 30.

The arrangement 35 also includes at least one oxygen injection arrangement, generally indicated by reference numeral 45. The arrangement 45 comprises an oxygen storage vessel 46, such as a pressurized oxygen cylinder, a pipeline 48 leading from the vessel to a control panel 50 for regulating the flow of oxygen from the vessel 32, and a conduit 52 leading from the control panel into the conduit 36. Instead of, or additionally to, leading into the conduit 26, the conduit 52 can lead into the conduit 40 and/or the conduit 44, oxygen can also instead, or additionally, be sparged into the tank 38. To the end of the conduit 52 inside the conduit 36 is attached an oxygen injection device. The oxygen injecting device may comprise a sonic nozzle by means of which oxygen at a pressure of 300-500 kPa is released through the nozzle at a velocity approaching the speed of sound, into the pipeline. The point or zone of injection is then preferably at an elbow in the conduit so that fluid turbulence is maximized and, as mentioned above, a sufficient distance from the next downstream vessel which is open to atmosphere, to allow the oxygen to dissolve. Ideally, the velocity of the water in the conduit 36 should be between 2 and 5 meters per second for good dispersion of the oxygen bubbles. For example, the injection means may then be that available under the trade name PRIMOX.

The milling stage 12 typically comprises at least one mill for milling wet ore entering it along the flow line 14 into a slurry. A lixiviant, typically calcium cyanide, enters the milling stage 12 along a flow line 16, and is admixed with the slurry in the milling stage. Typically, sufficient calcium cyanide is added to the milled ore, slurry or pulp so that it is present therein at a concentration of about 200 ppm (by mass).

The slurry or pulp from the stage 12 passes along the pipeline 20, to a leaching stage 18. The leaching stage 18 typically comprises at least one thickener and a series of pachucas or vessels in which the calcium cyanide can act on the gold-bearing ore to extract gold from the ore. Calcium cyanide containing water, separated from the slurry in the stage 18, is then returned to the silling stage 12 (not shown).

Slurry from the stage 18, containing the gold-bearing calcium cyanide, then passes to the stage 22 where it is contacted in known fashion with activated carbon or charcoal particles, typically in a series of vessels, in order to adsorb gold from the calcium, cyanide onto the activated charcoal particles. The activated charcoal particles are separated from the residual slurry, with the residual slurry then being processed further in known fashion. The gold-bearing activated charcoal particles pass along the flow line 28 to the gold recovery section 26 where the gold is recovered from the activated charcoal particles in known fashion.

By means of the oxygen injection arrangements 45, air or oxygen is introduced into the slurry stream. This increases the dissolved oxygen levels in the milled pulp. The Applicant believes that this will lead to increased gold value recoveries due to more complete gold dissolution in the calcium cyanide taking place, particularly if the process or plant 10 is running on greater than designed throughputs, or if the plant throughput is to be increased.

Furthermore, oxygen in the pulp or slurry is also consumed by unoxidized minerals and organics which are present in the ore. In their unoxidized state, these species react with calcium cyanide, rendering it unavailable for gold dissolution so that excess calcium cyanide rust thus be added to the pulp to compensate for this, leading to increased cyanide consumption. The oxygen introduction, as hereinbefore described, will thus, it is believed, also lead to a decrease in cyanide consumption.

The oxygen injection arrangement 30 and its point of introduction into the conduit is preferably selected such that the oxygen can be introduced into the conduit in a -turbulent zone and under pressure, since pressurized oxygen injection will enhance oxygen dissolution in the service water, while turbulent flow conditions will ensure that the gaseous bubbles of oxygen are well dispersed in the service water. The injection means should also be located at such positions that there is sufficient residence time downstream of the injection means to allow the oxygen to dissolve before it can escape to atmosphere. It is further believed that by introducing the oxygen into the slurry by means of the gland service water, particularly effective dissolution of oxygen in the slurry or pulp, i.e. oxygen transfer, will be obtained. In this manner oxygen usage or consumption can be optimized leading to cost savings.

Furthermore, by increasing the oxygen levels in the slurry by the oxygen injection arrangements, the reaction of gold with the calcium cyanide as hereinbefore described, takes place at a faster rate so that, apart from being able to increase plant throughput as hereinbefore described, the residence time of the gold in the process can be reduced. This has the advantage that the contact time of the carbonaceous material with the gold is reduced, lessening the re-absorption of the gold onto the carbonaceous material, thereby also enhancing gold recovery.

A further advantage of the oxygen injection provided by the present invention is that gold-bearing ores also contain iron pyrites minerals which also react with cyanide, i.e. consume calcium cyanide. Oxygen oxidizes these minerals to form ion hydroxides, which form as a cyanide-immune layer on the iron pyrites particles, thereby also reducing calcium cyanide consumption.

Preferably, sufficient oxygen is injected so that dissolved oxygen levels in the slurry in the pipeline 20 are maintained slightly above saturation level of oxygen in slurry at a point where slurry is open to atmosphere, e.g. in a downstream open vessel. The actual rate of oxygen injection will thus depend on the efficiency of dissolution, the oxygen consumption by the slurry, and the oxygen saturation levels in the slurry, but typically the injection rates can be 0.1-0.2 kg of oxygen per tonne of ore milled.

I claim:

1. A process for extracting metal values from an ore bearing a desired metal, which comprises:
    (a) milling a wetted ore containing the desired metal to produce an ore containing slurry;
    (b) adding a lixiviant to the slurry;
    (c) dissolving the desired metal from the slurry in the lixiviant to thereby leach the desired metal;
    (d) absorbing the dissolved metal from the lixiviant with activated carbon particles in a carbon-in-pulp absorption section;
    (e) separating the carbon particles from the slurry;
    (f) recovering the desired metal from the carbon particles;
    (g) conveying the slurry to and within each of steps (a) through (f) along pipelines, some of which pipelines are fitted with pumps, wherein some of the pumps are centrifugal pumps comprising a housing and a rotatable pump shaft, with glands or seals being provided around the shaft where it passes through the housing; and
    (h) adding water to the glands via a gland service water arrangement, with conduits and tank,
wherein the improvement comprises introducing, prior to step (f), and after the formation of the ore-containing slurry in step (a), a gaseous or liquid agent, which agent is capable of promoting recovery of the metal values from the ore, into the gland service water arrangement of at least one of the pumps.

2. The process of claim 1 wherein the metal is a noble metal.

3. The process of claim 2, wherein the noble metal is gold.

4. The process of claim 1, wherein the lixiviant is cyanide-based.

5. The process of claim 4, wherein the cyanide-based lixiviant is calcium cyanide or sodium cyanide.

6. The process of claim 5, wherein calcium cyanide is added to obtain a concentration of about 200 ppm by mass.

7. The process of claim 1, wherein the agent is oxygen or an oxygen-containing gas and said agent is dissolved in the slurry.

8. The process of claim 7, wherein a sufficient amount of the agent is introduced collectively to the process to ensure that the dissolved oxygen in the slurry is maintained at a value slightly higher than the saturation level of oxygen in a slurry opened to atmosphere.

9. The process of claim 7, wherein the agent is introduced upstream of step (f) in an amount of between 0.1 and 0.2 kilograms oxygen per ton of ore.

10. The process of claim 1, comprising introducing the agent into the gland service water arrangement by a method selected from injecting the agent into one of the conduits, sparging the agent into the tank or combination thereof.

11. The process of claim 7, wherein oxygen or the oxygen-containing gas is injected via an oxygen injecting device comprising a sonic nozzle with a release pressure of 300–500 kPa and adapted to inject said gas at a velocity approaching the speed of sound.

12. The process of claim 7, comprising injecting oxygen or the oxygen-containing gas under conditions maximizing fluid turbulence and at a sufficient distance from the next downstream process step in which a vessel is opened to the atmosphere to thereby allow the oxygen to dissolve.

13. The process of claim 11, wherein the velocity of the water is between 2 and 5 meters per second.

14. An apparatus for extracting metal values from an ore bearing a desired metal, which comprises:
   (a) a mill for wetted ore to produce an ore containing slurry;
   (b) means for adding a lixiviant to the slurry;
   (c) metal leaching means for dissolving the desired metal in the lixiviant;
   (d) a carbon-in-pulp section containing an absorber for absorbing the dissolved metal from the lixiviant with activated carbon particles;
   (e) a separator for removing the carbon particles with metal from the slurry;
   (f) a recovery means for removing the metal from the carbon particles;
   (g) means for conveying slurry to and within devices (a) through (f) via pipelines wherein some of the pipelines are fitted with pumps, and wherein some of the pumps are centrifugal pumps comprising a housing and a rotatable pump shaft, with glands or seals being provided around the shaft where it passes through the housing; and wherein the improvement comprises means for introducing, prior to entry of the carbon particles with metal into the recovery means, a gaseous or liquid agent, which agent is capable of promoting recovery of the metal values from the ore, into the gland service water of at least one of the pumps, wherein the metal is gold, the lixiviant is calcium cyanide, and the agent is oxygen or an oxygen-containing gas.

* * * * *